United States Patent
Choi et al.

(10) Patent No.: US 8,705,460 B1
(45) Date of Patent: Apr. 22, 2014

(54) AUTONOMOUS ADAPTATION OF MODULATION AND CODING SCHEME FOR PERSISTENT SCHEDULING IN ELECTRONIC COMMUNICATION

(75) Inventors: Jihwan P. Choi, San Jose, CA (US); Jungwon Lee, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 1234 days.

(21) Appl. No.: 12/573,473

(22) Filed: Oct. 5, 2009

Related U.S. Application Data (60) Provisional application No. 61/105,266, filed on Oct. 14, 2008.

(51) Int. Cl.
*H04W 4/00* (2009.01)
*H04B 7/00* (2006.01)

(52) U.S. Cl.
USPC ............................ 370/329; 370/310; 370/328

(58) Field of Classification Search
USPC ......................................................... 370/329
See application file for complete search history.

(56) References Cited

U.S. PATENT DOCUMENTS

2010/0080176 A1* 4/2010 Maas et al. .................... 370/329

OTHER PUBLICATIONS

"802.16™ IEEE Standard for Local and Metropolitan Area Networks—Part 16: Air Interface for Fixed Broadband Wireless Access Systems," IEEE Standards, IEEE Computer Society and the IEEE Microwave Theory and Techniques Society, IEEE Std 802.16™ -2004 (Revision of IEEE Std 802.16-2001), Oct. 1, 2004, pp. 1-857.

"WiMAX Forum™ Mobile Radio Conformance Tests (MRCT) Release 1.0 Approved Specification (Revision 2.1.0)," WiMAX Forum Mobile RCT, Doc No. WiMAX XX xxx xxx v2.1.0, Apr. 2008, pp. 1-403.

"3rd Generation Partnership Project; Technical Specification Group Radio Access Network; Evolved Universal Terrestrial Radio Access (E-UTRA) Medium Access Control (MAC) Protocol Specification (Release 8)," 3GPP TS 36.321 v8.5.0, Mar. 2009, pp. 1-46.

"3rd Generation Partnership Project; Technical Specification Group Radio Access Network; Evolved Universal Terrestrial Radio Access (E-UTRA); Physical Layer Procedures (Release 8)," 3GPP TS 36.213 v8.6.0, Mar. 2009, pp. 1-77.

"3rd Generation Partnership Project; Technical Specification Group Radio Access Network; Evolved Universal Terrestrial Radio Access (E-UTRA); Multiplexing and Channel Coding (Release 8)," 3GPP TS 36.212 v8.6.0, Mar. 2009, pp. 1-59.

\* cited by examiner

*Primary Examiner* — Shripal Khajuria (57) ABSTRACT

Communication circuitry that employs persistent scheduling conventionally uses one initiation command to establish the modulation and coding scheme ("MCS") that will be used for transmission of subsequent payload bursts, at least until it is time to send another initiation command. Inefficiency can result if transmission channel conditions change between initiation commands. To avoid such inefficiency, the disclosed circuitry maintains a count of unsuccessful transmission attempts. When the count deviates from a predetermined reference standard, the circuitry automatically and autonomously makes an appropriate change in the MCS selection without waiting for the next initiation command. Both transmitter and receiver circuits independently operate in the same way at the same time so that both ends of a communication link remain coordinated with one another.

20 Claims, 9 Drawing Sheets

| FIG. 4 ELEMENT | SAME OR SIMILAR ELEMENT(S) IN FIG. 3 |
|---|---|
| 310 | 110, 220 |
| 320 | 120, 210 |
| 330a | 221 |
| 330b | 130 |
| 340 | 140, 250 |
| 350 | 150, 240 |
| 360 | 160, 250 |
| 370 | 170, 260 |
| 380 | 180, 270 |
| 390 | 190, 280 |

AUTONOMOUS ADAPTATION OF MODULATION AND CODING SCHEME FOR PERSISTENT SCHEDULING IN ELECTRONIC COMMUNICATION

CROSS REFERENCE TO RELATED APPLICATIONS

This application claims the benefit of U.S. provisional patent application No. 61/105,266, filed Oct. 14, 2008, which is hereby incorporated by reference herein in its entirety.

BACKGROUND

This disclosure relates to electronic communication. More particularly, the disclosure relates to electronic communication of the type that employs what is known as persistent scheduling.

Certain types of electronic communication can make use of any one of two or more (i.e., a plurality of) different modulation and coding schemes ("MCSs") for communication at different times, depending on the condition of the communication or transmission link at such different times. Examples of different types of modulation that may be used are quadrature phase shift keying ("QPSK"), 16-quadrature amplitude modulation ("16-QAM"), 64-quadrature amplitude modulation ("64-QAM"), etc. Examples of different types of coding that may be used are tail-biting convolutional codes ("TBCC") or convolutional turbo codes ("CTC") with various specific code rates of 1/4, 1/2, 3/4, and the like. Thus MCS in this disclosure means the combination of modulation and coding rate, such as QPSK 1/4, QPSK 1/2, 16-QAM 1/2, 64-QAM 1/2, 64-QAM 3/4, and the like. The different MCSs provide trade-offs between bandwidth efficiency and transmission reliability. For example, one such MCS may have greater transmission reliability than a second such MCS. The first MCS may therefore need to be used to achieve satisfactory communication while the condition of the transmission link is relatively poor. However, such a greater-reliability MCS may be relatively slow and/or may consume greater bandwidth. Therefore, when communication link conditions improve, it may be advantageous to switch to use of another MCS with lesser but still adequate transmission reliability.

The type of communication known as persistent scheduling employs one burst of initiation command signals followed by a specified number of successive bursts of "payload" data signals. Among other parameters, the initiation command burst establishes what MCS will be used for all subsequent payload bursts (at least until the next full initiation command burst). Persistent scheduling can be efficient because persistent scheduling confines all set-up instructions to the initiation burst, and then allows several payload bursts to be transmitted free of such set-up information. This makes the payload bursts more efficient. A problem or inefficiency can arise, however, if transmission link conditions change significantly subsequent to transmission of an initiation burst and during transmission of the following payload bursts. For example, if the transmission link deteriorates, some payload bursts may need to be transmitted more than once until the payload bursts are properly received. On the other hand, if transmission link conditions improve, it is not possible to take advantage of that improvement by switching to a more efficient MCS until after completion of the full persistent scheduling sequence, when another full initiation burst can be sent to change the MCS.

SUMMARY

In accordance with certain possible aspects of the disclosure, a method of operating transceiver circuitry for electronic communication that can employ any one of a plurality of modulation and coding schemes ("MCSs") may include selecting a first MCS of the plurality of MCSs; using the first MCS to receive successive bursts of electronic data, at least some of the bursts requiring the transceiver circuitry to transmit an acknowledge ("ACK") or non-acknowledge ("NAK") signal respectively indicative of whether or not the transceiver circuitry correctly received the burst; maintaining an electronic record indicative of occurrences of the NAK signal; comparing the record to an electronically stored reference standard; causing the transceiver circuitry to select a second MCS of the plurality of MCSs in response to the record deviating from the reference standard; and using the second MCS to receive further successive bursts of electronic data.

In accordance with certain other possible aspects of the disclosure, electronic circuitry for electronic communication using any one of a plurality of MCSs may include receiver circuitry to receive successive bursts of data signals using any one of the plurality of MCSs; decision circuitry to determine whether a burst of data has been properly received, and if not, to cause transmitter circuitry of the electronic circuitry to transmit a NAK signal; record circuitry to maintain a record of occurrences of the NAK signal; and selection control circuitry to select which of the plurality of MCSs is used by the receiver circuitry based on comparison of the record to a reference standard.

DETAILED DESCRIPTION

Figure 1:
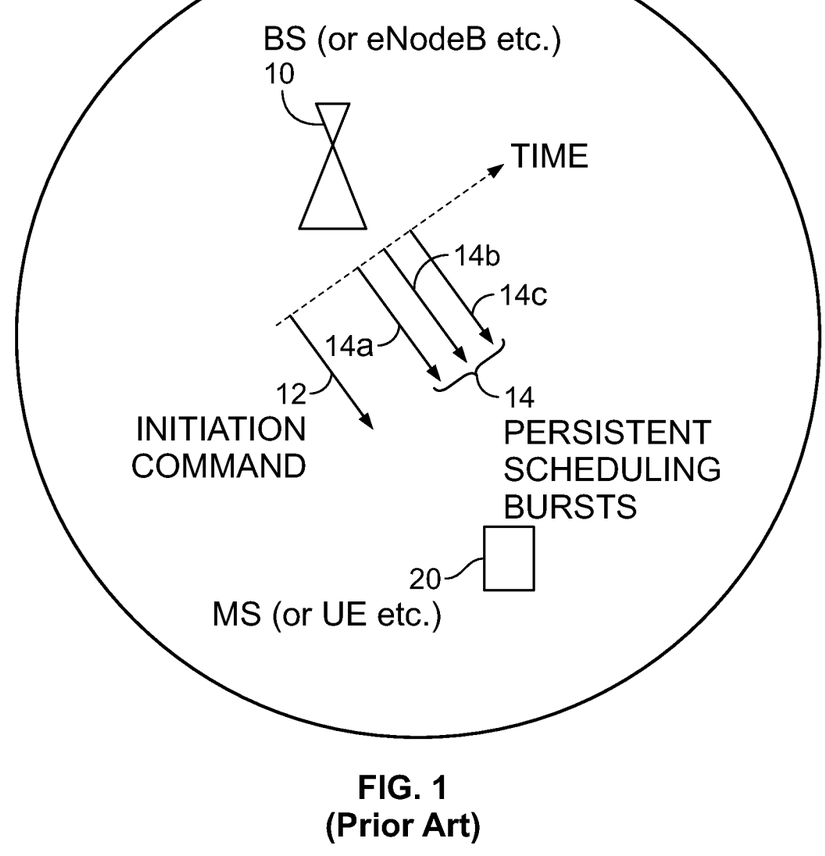
FIG. 1 is a simplified diagram showing an example of known persistent scheduling in electronic communication.

FIG. 1 shows an example of known wireless electronic communication that is primarily from a base station ("BS") 10 to a mobile station ("MS") 20. An alternative term for base station 10 is eNodeB or the like. Alternative terms for mobile station 20 are mobile unit, user equipment ("UE"), or the like. The communication depicted in FIG. 1 employs persistent scheduling. Although this example shows primarily "downlink" communication (from base station 10 to mobile station 20), it will be understood that the communication can alternatively be "uplink" communication (i.e., from mobile station 20 to base station 10), or both downlink and uplink communication.

As shown in FIG. 1, a persistent scheduling communication sequence begins with initiation command signal burst 12, which establishes most or all parameters for the subsequent persistent scheduling or payload signal bursts 14*a*, 14*b*, etc. For example, initiation command 12 establishes the MCS that will be used for all payload bursts 14 that follow the initiation burst.

Figure 2:
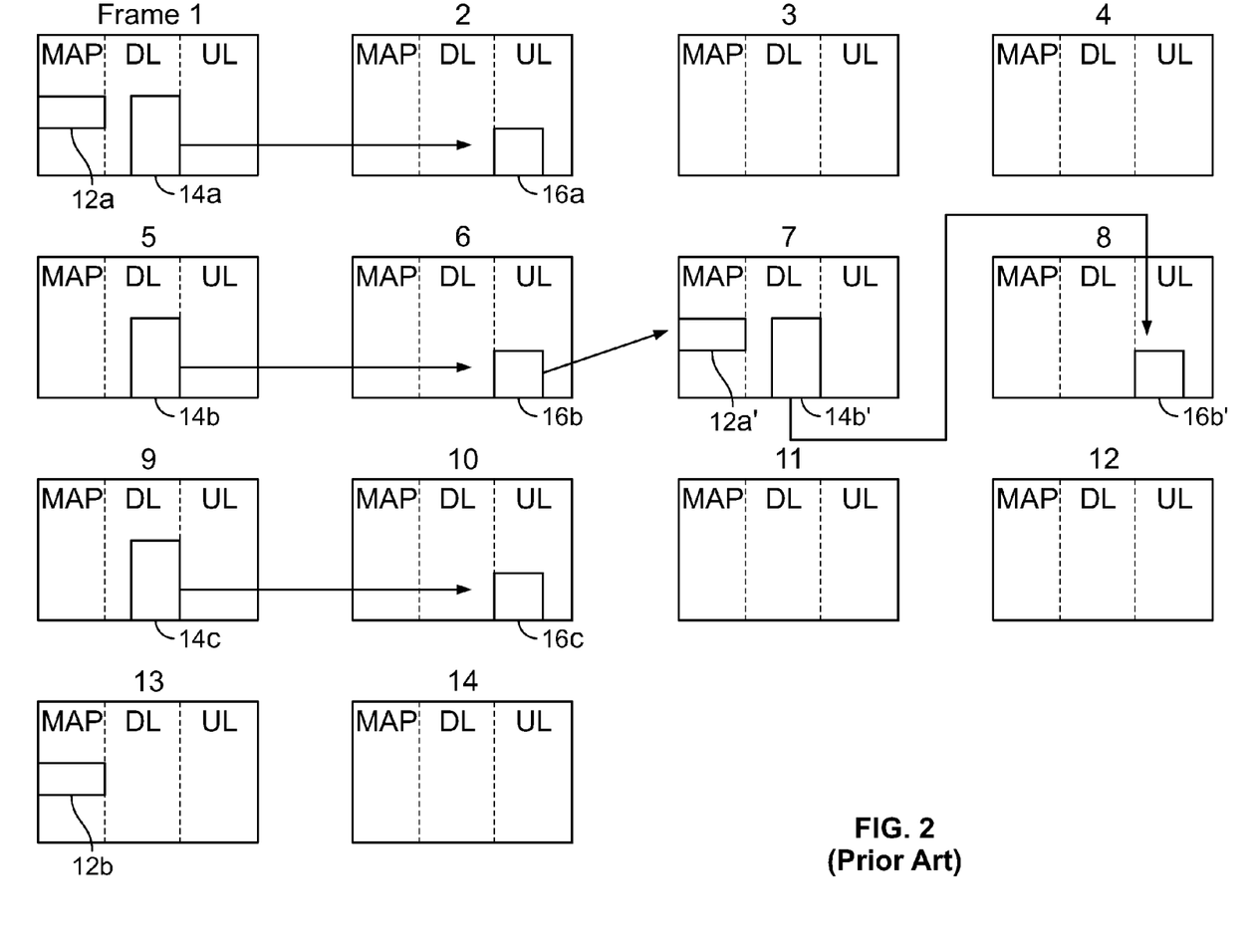
FIG. 2 is a simplified transmission sequence diagram showing an example of communication like that illustrated by FIG. 1.

FIG. 2 shows an example of persistent scheduling communication in the type of communication known as WiMAX. Such communication employs a succession of "frames," illustratively numbered 1-14 in FIG. 2. Each frame reserves times for (1) "MAP" signalling, which can be used for transmitting an initiation command like 12 in FIG. 1; (2) downlink ("DL") signalling, which can be used for payload data communication from base station 10 to mobile station 20; and (3) uplink ("UL") signalling, which can be used for payload data communication from mobile station 20 to base station 10.

The particular persistent scheduling protocol that has been set up (by the initiation command 12*a* in frame 1) intends to send three subsequent downlink payload bursts 14*a*, 14*b*, and 14*c* in frames 1, 5, and 9, respectively. Thus, later in frame 1, base station 10 sends payload burst 14*a* to mobile station 20. During the UL phase of subsequent frame 2, mobile station 20 sends back to base station 10 signals 16*a* that indicate whether or not mobile station 20 successfully received payload burst 14*a*. A signal burst (like 16*a*) indicating successful receipt of a payload burst (like 14*a*) is called an "acknowledge" or "ACK" signal. A signal burst (like 16*a*) indicating that a payload burst (like 14*a*) was not successfully received is called a "non-acknowledge" or "NAK" signal. In the particular example shown in FIG. 2, signal 16*a* is an ACK signal. This allows the persistent scheduling communication to proceed as originally specified in initiation command 12*a*.

As a result of the ACK in frame 2, the persistent scheduling proceeds with the DL of another payload burst 14*b* in frame 5. This time, however, the payload burst is not successfully received, which causes mobile station 20 to upload a NAK 16*b* in frame 6. Such a NAK causes the persistent scheduling routine to modify itself as follows. In frame 7 a supplementary initiation command 12*a'* is sent by base station 10 to tell mobile station 20 to expect a repeat of payload burst 14*b* (now referenced 14*b'*) later in frame 7. Although other possibilities exist for supplementary initiation burst 12*a'*, one possibility (generally contemplated here) is for burst 12*a'* to be less than a full initiation burst like 12*a*. Instead, burst 12*a'* can be greatly abbreviated, primarily for the purpose of telling mobile station 20 that a repeat of payload burst 14*b* is coming later in frame 7, but not otherwise altering the persistent scheduling previously set up in initiation burst 12*a*. For example, burst 12*a'* does not alter the MCS choice or selection made in burst 12*a*. The above-mentioned repetition of payload burst 14*b* (now referenced 14*b'*) is then sent. FIG. 2 shows that this repetition is successfully received, as indicated by the ACK 16*b'* sent in frame 8. This allows the original persistent scheduling routine to continue with the transmission of payload burst 14*c* in frame 9. This payload burst is successfully received, as acknowledged by the ACK 16*c* in frame 10. Another persistent scheduling routine can begin with another full initiation burst 12*b* in frame 13.

From the foregoing, it will be seen that the typical persistent scheduling scheme does not include the ability to change the MCS that is initially selected, even though the quality of the transmission link may become inappropriate during the persistent scheduling communication. Such inappropriateness may be due to either under-adequacy or over-adequacy of the transmission link for communication using the MCS initially selected.

Figure 3:
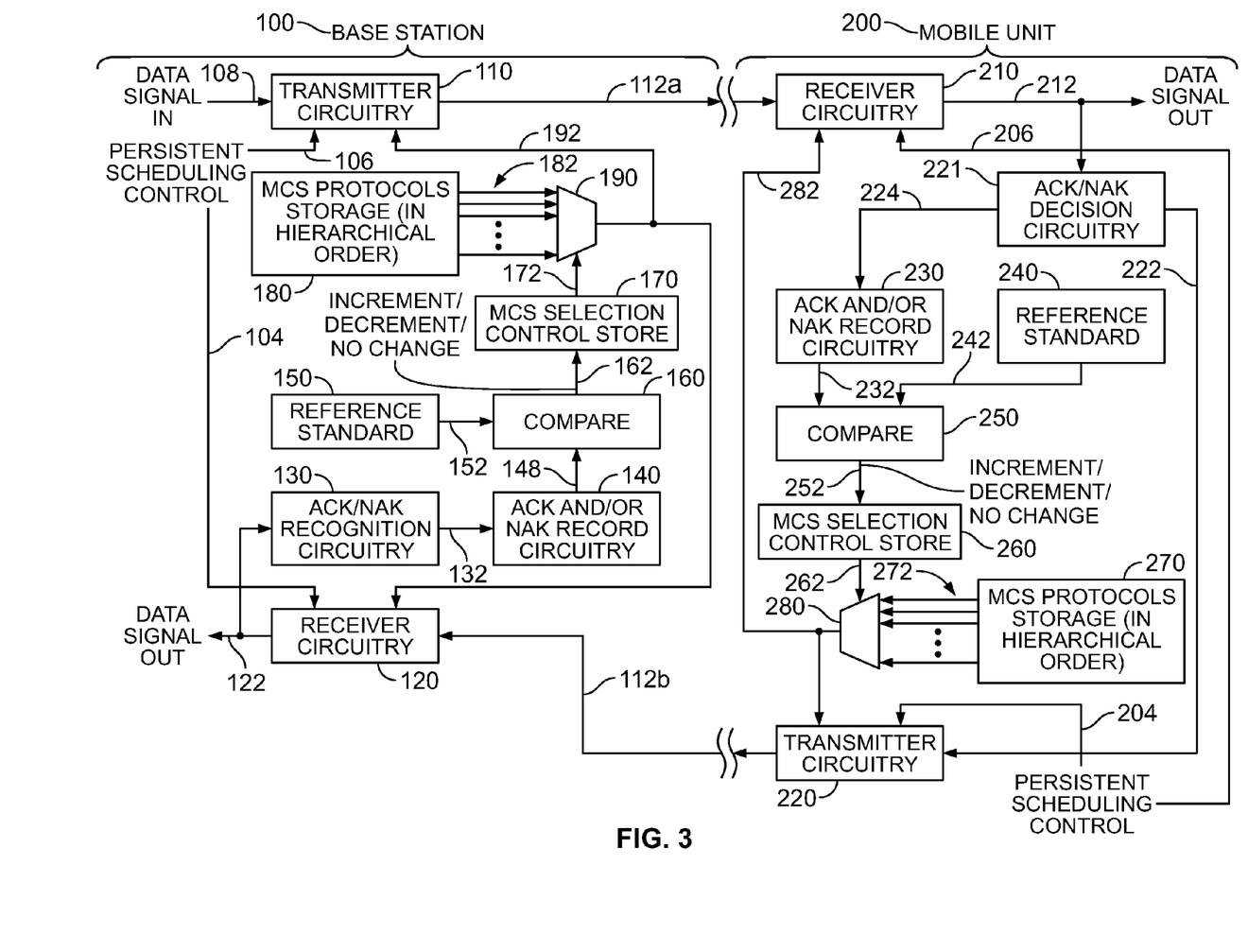
FIG. 3 is a simplified schematic block diagram showing an illustrative embodiment of apparatus in accordance with the disclosure.
Figure 4:
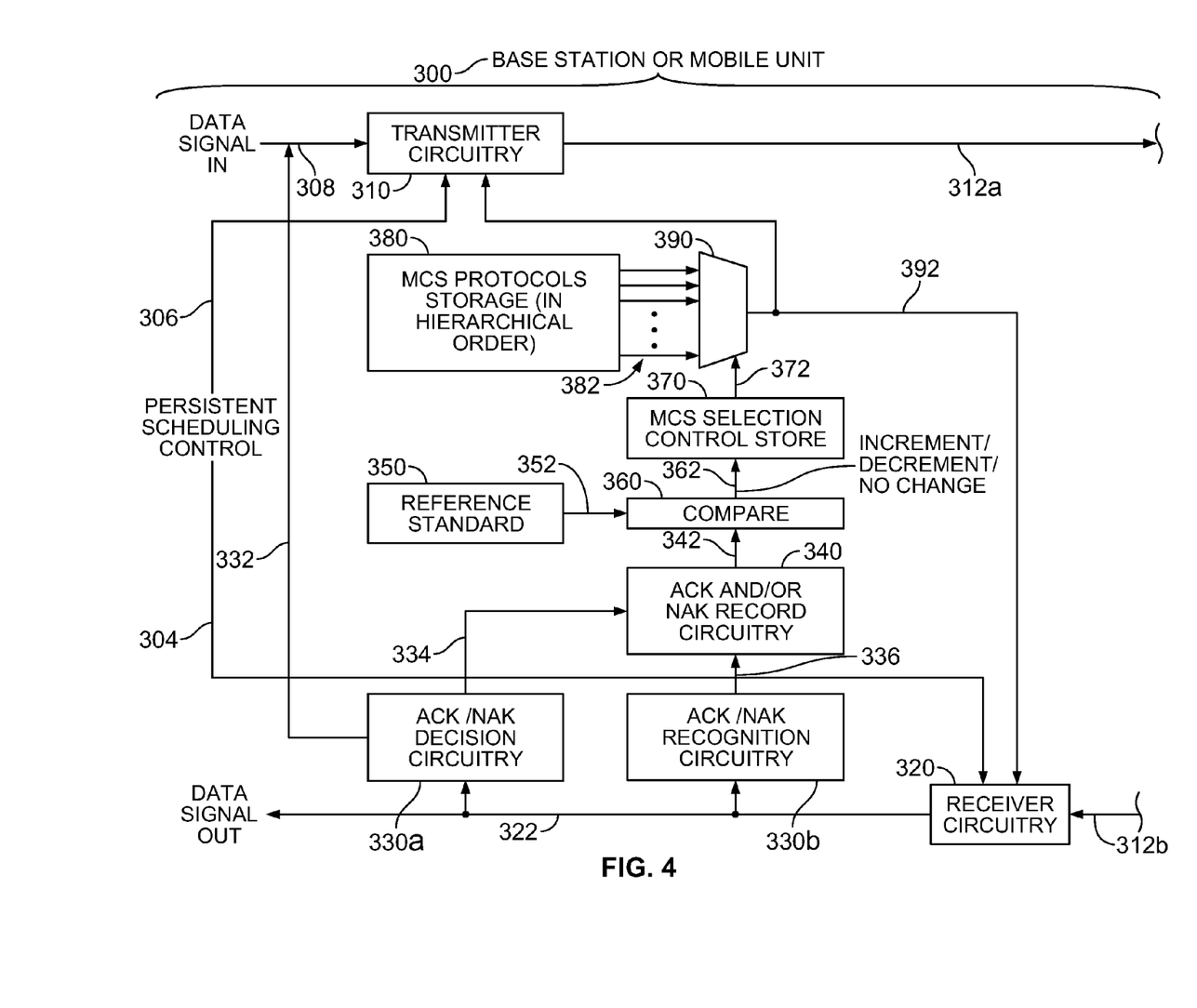
FIG. 4 is a simplified schematic block diagram showing another illustrative embodiment of apparatus in accordance with the disclosure.

An illustrative embodiment of modifications that can be made to base station and mobile station circuitry in accordance with this disclosure to allow such system components to autonomously change MCS when desirable (and with or without otherwise affecting persistent scheduling) is shown in FIG. 3. FIG. 3 shows a modified base station 100 and a modified mobile unit 200 for communication that is basically DL communication (i.e., like the communication shown in FIGS. 1 and 2). However, FIG. 4 shows an illustrative embodiment of generally similar circuitry 300 that can be used in either a base station or a mobile unit in order to implement the present disclosure in systems that employ full two-way communication (i.e., both full DL and full UL communication). FIG. 3 will be described first; FIG. 4 will be described later.

As shown in FIG. 3, an illustrative embodiment of base station circuitry 100 in accordance with the disclosure includes transmitter circuitry 110 and receiver circuitry 120, each of which can be per se conventional. Circuitry 100 may thus sometimes be referred to as transceiver circuitry. Basically, transmitter circuitry 110 transmits data (embodied in electrical, electronic, electro-magnetic, optical, or the like form) from upstream circuitry (not shown, but per se conventional) to mobile unit 200. For convenience herein, all of the various possible forms of communication between a base station and a mobile unit will sometimes be referred to generically as "electronic communication" of "electronic data" or the like. Similarly, all suitable forms of base stations and mobile units will sometimes be referred to generically as "electronic communication devices" or the like.

"Data signal in" lead 108 is the route by which transmitter 110 receives the above-mentioned data signal information from the upstream circuitry. The data on lead 108 may include any MAP or DL data that needs to be sent to mobile unit 200. The transmission link 112*a* from transmitter 110 to mobile unit 200 may be any form of communication link (typically electrical, electronic, electro-magnetic, optical, or the like, and also typically at least partly wireless). Although a separate return transmission link 112*b* is shown in FIG. 3, it will be understood that links 112*a* and 112*b* may be partly or wholly combined into one two-way communication link.

In one implementation, transmitter circuitry 110 operates, at least partly, under the control of persistent scheduling control signals 106 that may (like data-in signal 108) also come from the above-mentioned upstream circuitry in base station 100. As just one example of such persistent scheduling control signals 106, these signals may tell transmitter 110 which one of two or more MCSs the transmitter should use for sending data to mobile 200. In accordance with the present disclosure, however, such an MCS instruction in signals 106 can be over-ridden or superceded by a different MCS instruction applied to transmitter 110 via lead or leads 192 (the use of which will be described in detail later in this specification).

Receiver circuitry 120 receives UL data/information signals from mobile unit 200 via transmission link 112*b*. For example, this data may include ACK (e.g., 16*a* in FIG. 2) or NAK (e.g., 16*b* in FIG. 2) signals from the mobile unit. Receiver 120 outputs the data the receiver 120 receives via "data signal out" lead 122. This data output from receiver 120 can go to the above-mentioned upstream circuitry in base station 100 for processing and use in various ways that can be per se conventional. For example, the upstream circuitry can recognize ACK and respond thereto by allowing a persistent scheduling communication sequence to continue without repetition of any already-transmitted data (e.g., as shown in frame 5 in FIG. 2). Alternatively, the upstream circuitry may recognize a NAK and respond thereto by causing transmitter 110 to send a supplementary MAP command or burst 12a' and a repeated payload data burst 14b' as shown in frame 7 in FIG. 2. The data output 122 of receiver 120 is also applied to ACK/NAK recognition circuitry 130.

We turn now to more possible aspects of the receiver portion of circuitry 100. Some of these aspects (such as control 104 and the branch of control 192 that is shown going to receiver 120) may not be needed in the base station for DL operation (in which receiver 120 only needs to check the ACK/NAK from transmission link 112b). However, these aspects are needed for UL operation, and so they are described here to make the base station transceiver discussion complete for more generalized operation.

Like transmitter 110, receiver 120 may be at least partly controlled by persistent scheduling control signals 104 (similar to or the same as above-described signals 106). For example, signals 104 may tell receiver 120 what MCS to use in its operation; although, again, this MCS selection may be over-ridden by a different MCS selection supplied via lead or leads 192 in accordance with this invention.

ACK/NAK recognition circuitry 130 can be per se conventional circuitry that can recognize when UL data received from mobile unit 200 is (or includes) an ACK or NAK signal. In addition, circuitry 130 can distinguish ACK from NAK, and can output signals 132 indicative of whether an ACK or a NAK has been received. The output signals 132 of circuitry 130 are applied to ACK and/or NAK record circuitry 140.

Although FIG. 3 shows circuitry 130 as a separate element, it will be appreciated that the above-mentioned upstream circuitry in base station 100 may also need to perform a similar ACK/NAK recognition function. Thus an alternative way to get the ACK-indicating and NAK-indicating signals 132 needed by circuitry 140 may be to obtain them from the above-mentioned upstream circuitry.

Figure 5:
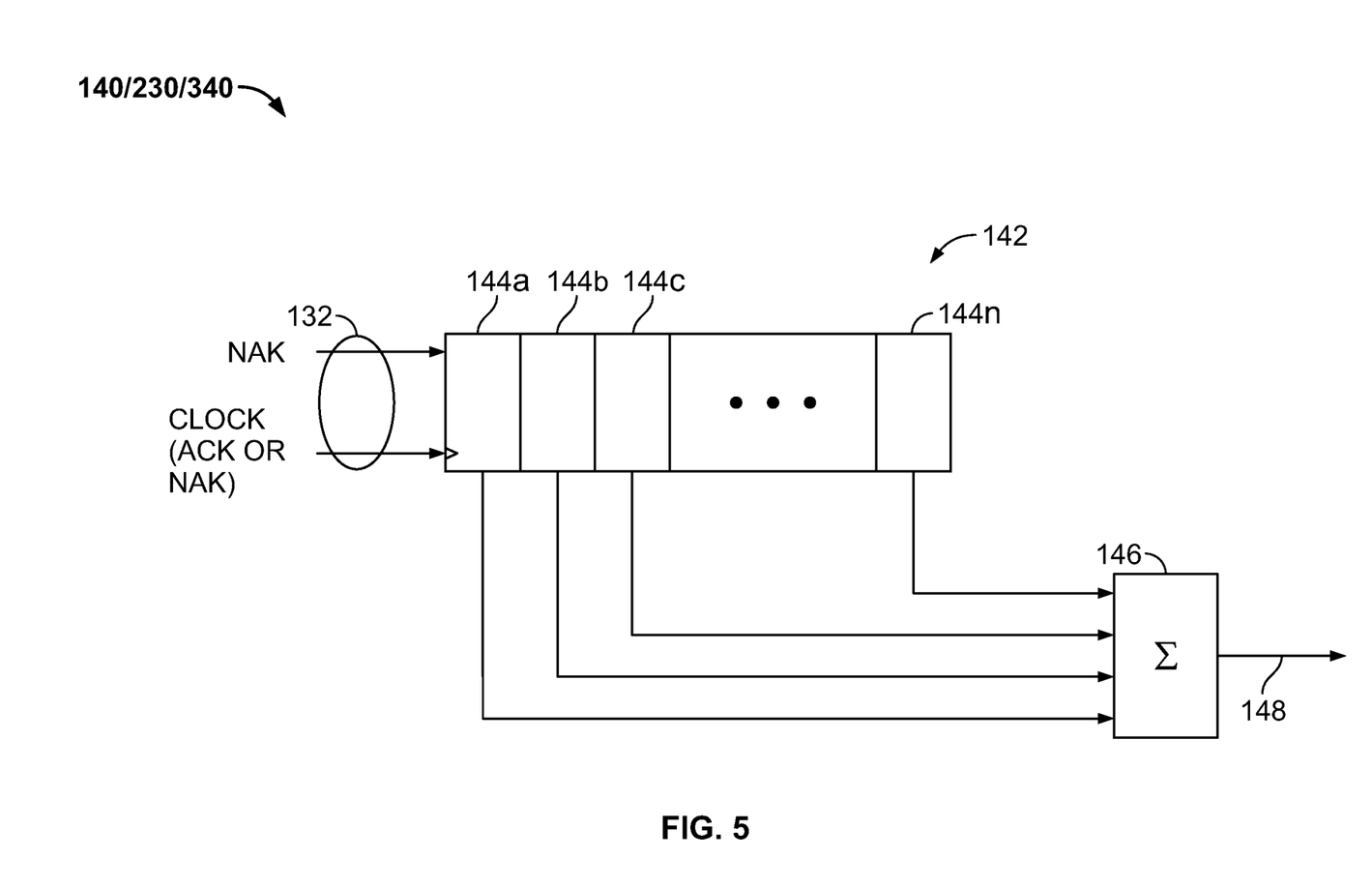
FIG. 5 is a simplified schematic block diagram of an illustrative embodiment of a component that can be used in the FIG. 3 and/or FIG. 4 apparatus.

ACK and/or NAK record circuitry 140 is circuitry for maintaining a record of recent occurrences of at least NAK signals. An illustrative embodiment of how circuitry 140 may be constructed is shown in FIG. 5. In this embodiment, circuitry 140 basically includes a shift register circuit 142 and a summation circuit 146. Shift register 142 includes a plurality of register stages 144a through 144n. All of stages 144 are clocked by the same "clock" signal, which can be asserted whenever circuitry 130 detects the occurrence of either an ACK signal or a NAK signal. The "data" applied to register 142 for shifting through that register in response to (and in synchronization with) the clock signal is a "NAK" signal (e.g., logic 1 whenever a NAK has occurred, and logic 0 otherwise (e.g., when an ACK has occurred)). Accordingly, at any given time, the ones and zeros stored in registers 144a through 144n are a record of the n most-recent ACK and NAK signals. For example, register 144n will contain the oldest of that ACK/NAK historical data or information, and register 144a will contain the newest of that data. The parameter n may have any desired integer value.

In addition to passing its data content on to the next register or stage 144 in shift register 142 in response to each assertion of the "clock" signal, each register 144 also applies its current data content to a respective one of the inputs of summation (adder) circuitry 146. Circuitry 146 adds all the ones and zeros applied to it, and produces output signals 148 indicative of that sum. As an example, if within the n ACK/NAK data samples stored in shift register 142 there have been 4 NAK occurrences, then the output 148 of summation circuitry 146 may be 4 (or any other output proportional to or indicative of 4).

Because shift register 142 only retains the n most recent ACK-indicating and NAK-indicating signals (e.g., from circuitry 130), the "record" of this data maintained by circuitry 140 is a "moving record." This means that shift register 142 is always discarding its oldest data (from register stage 144n) in order to take in each successive new data item (into register stage 144a). The outputs 148 of circuit 146 will therefore tend to move up (increase in numerical value) and down (decrease in numerical value) over time as the number of recent NAKs increases or decreases. Outputs 148 therefore provide a measure of how good a match for current transmission link conditions the current MCS selection is. If outputs 148 are relatively high (e.g., as a fraction or percentage of n), then a lot of NAKs have recently occurred, and the currently selected MCS may not be providing high enough transmission reliability relative to what may be relatively poor transmission link performance. This may call for selection of a different MCS having greater transmission reliability. On the other hand, if outputs 148 are relatively low (e.g., as a fraction or percentage of n), then relatively few NAKs have recently occurred. This may warrant selection of a different MCS having less transmission reliability so that transmission link 112 can be used more efficiently.

The embodiment of circuitry 140 that is shown in FIG. 5 is only an example of how such ACK and/or NAK record circuitry may be constructed. For example, instead of a shift register, one or more counters of various types may be used. As an illustration, a counter that counts up in response to each NAK occurrence and down in response to each ACK occurrence can be used to give an indication of whether there are too many or too few NAKs occurring. Still other variations will be apparent to those skilled in the art.

The output signals 148 of circuitry 140 are applied to one set of inputs to compare circuitry 160. Signals 152 indicative of a reference standard 150 are applied to a second set of inputs to compare circuitry 160. Reference standard element 150 may be circuitry (e.g., memory circuitry) for storing and outputting (on leads 152) signals indicative of what the outputs 148 of circuitry 140 should be if the MCS currently being used is reasonably appropriate (e.g., not causing too many or too few NAKs). Reference standard 150 may have more than one threshold. For example, it may output an upper limit threshold and a lower limit threshold, each of which is compared by compare circuitry 160 to the ACK/NAK record output signals 148 from circuitry 140. To take a specific example of this, the upper limit may be 6 and the lower limit may be 0. When compare circuitry 160 detects that signals 148 have reached 6, circuitry 160 may output a signal 162 causing MCS selection control store circuitry 170 to increment (increase by 1) a value stored in (and output by) circuitry 170. On the other hand, when compare circuitry 160 detects that signals 148 have reached 0, circuitry 160 may output a signal 162 causing circuitry 170 to decrement (decrease by 1) a value stored in (and output by) circuitry 170. As long as outputs 148 are between 0 and 6, circuitry 160 outputs a "no change" signal 162, which leaves the value stored in and output by circuitry 170 unchanged.

From the foregoing it will be appreciated that an illustrative embodiment of circuitry 170 may be a counter that counts up in response to an "increment" output signal 162, that counts down in response to a "decrement" signal, and that does not change its count while output signal 162 indicates "no change." Other constructions for circuitry 170 will be apparent to those skilled in the art.

The output signals 172 of circuitry 170 are applied to selection control inputs of multiplexer ("mux") circuitry 190. The selectable inputs 182 to mux circuitry 190 come from MCS protocols storage circuitry 180. Each line 182 in FIG. 3 typically represents several signal leads, sufficient in number to provide at least a unique signal code for each MCS that the FIG. 3 circuitry can use. For simplicity (although this is not a requirement) it is assumed that these MCS codes (or other MCS signal information) are stored in (and output by) circuitry 180 in order of the transmission reliability that each MCS provides (so-called "hierarchical order"). Thus, for example, the MCS indicated by the information on the topmost line 182 may have the greatest transmission reliability measure. The MCS indicated by the information in the next-to-topmost line 182 may have the next-to-greatest transmission reliability measure. This hierarchical ordering may continue until the MCS indicated by the information on the bottom-most line 182 is reached, which MCS may have the least transmission reliability measure. (As some specific examples, transmission reliability decreases for illustrative MCSs QPSK 1/4, QPSK 1/2, 16-QAM 1/2, 64-QAM 1/2, and 64-QAM 3/4, in that order. (On the other hand, bandwidth efficiency increases.)) In such an example, a relatively high value 172 output by circuitry 170 causes mux 190 to select and output (on leads 192) MCS identifying or specifying signal information from a relatively high line 182. This will be information for an MCS that gives relatively high transmission reliability. Conversely, a relatively low value 172 output by circuitry 170 causes mux 190 to select and output (on leads 192) MCS identifying or specifying signal information from a relatively low line 182. This will be information for an MCS that gives relatively low transmission reliability.

The signals 192 output by mux 190 are applied to transmitter 110. If these signals 192 indicate a different MCS than transmitter 110 is currently using, then transmitter 110 switches to using that different MCS. Signals 192 may also be applied to receiver 120, with similar effect on that circuitry. In other words, if signals 192 indicate a different MCS than receiver 120 is currently using, then receiver 120 switches to using that new MCS. In this way the circuitry of this invention can cause base station 100 to autonomously and automatically change the MCS the circuitry is using to better match the actual, current condition of transmission link 112. If transmission link 112 is currently poor, leading to an undesirably high incidence or rate of NAKs, base station 100 automatically switches to an MCS that gives greater transmission reliability. On the other hand, if link 112 is performing well, resulting in a very low incidence or rate of NAKs, then the current MCS may be more reliable than is really needed for satisfactory communication, and base station 100 automatically switches to an MCS that has less transmission reliability. As noted above, these MCS changes are made autonomously by the circuitry shown in FIG. 3 and (in one implementation) without otherwise changing or interrupting persistent scheduling communication that may be in progress. From the next section of this description it will be apparent that it is not necessary for base station 100 to communicate its autonomous MCS changes to mobile unit 200, because mobile unit 200 is constructed and operated to independently, automatically, and autonomously mirror all MCS changes that base station 100 makes for itself.

Turning now to mobile unit 200, that circuitry includes receiver circuitry 210 and transmitter circuitry 220, both of which can be per se conventional. Circuitry 200 may thus sometimes be referred to as transceiver circuitry. Receiver 210 receives signals from link 112a and outputs those signals at 212. Outputs 212 go to downstream circuitry (not shown, but per se conventional) in mobile unit 200 for whatever use is to be made of received signals. Outputs 212 are also applied to ACK/NAK decision circuitry 221. The operation of receiver 210 may be at least partly controlled by persistent scheduling control signals 206, which may come from the above-mentioned downstream circuitry in mobile unit 200. Again, however, the MCS selection made by signals 206 may be over-ridden by signals 282 (described below).

ACK/NAK decision circuitry 221 examines received signals 212 to determine whether or not the received signals have been transmitted and received properly. If so, that is an ACK condition; if not, that is a NAK condition. If ACK/NAK decision circuitry 221 detects an ACK condition, ACK/NAK decision circuitry 221 generates ACK output signals on leads 222, which transmitter circuitry 220 sends back to base station 100 via link 112b. This is like the ACK UL 16a in frame 2 of FIG. 2. On the other hand, if ACK/NAK decision circuitry 221 detects a NAK condition, ACK/NAK decision circuitry 221 generates NAK output signals on leads 222, which transmitter 220 sends back to base station 100 via link 112b. This is like the NAK UL 16b in frame 6 of FIG. 2.

In addition to producing the ACK or NAK signals 222 that mobile unit 200 uplinks to base station 100, ACK/NAK decision circuitry 221 outputs signals 224 indicative of whether ACK/NAK decision circuitry 221 has detected an ACK condition or a NAK condition.

Analogous to what was said about element 130 earlier, the above-mentioned downstream circuitry in mobile unit 200 may also need to (conventionally) perform functions like those performed by element 221. Thus an alternative source for signals 222 and 224 may be the above-mentioned downstream circuitry, so that element 221 does not have to be separately (or duplicatively) provided.

It will be appreciated that the output signals 224 of circuitry 220 are not only similar to signals 132, but that these signals 224 are also logically the same as the substantially concurrent signals 132. In other words, signals 132 necessarily mirror signals 224 as a result of the conventional transmission of conventional ACKs and NAKs generated by mobile unit 200 to base station 100. No additional signalling or communication between base station 100 and mobile unit 200 (beyond this conventional (prior art as in FIG. 2) ACK and NAK signalling) is needed to cause signals 132 and 224 to thus synchronously mirror (duplicate) one another.

Signals 224 are applied to ACK and/or NAK record circuitry 230, which can be the same as element 140 in base station 100. Because these elements are the same, and because they receive signals that are logically the same at logically the same time, element 230 outputs signals 232 that approximately concurrently mirror output signals 148 of element 140.

Compare circuitry 250 can be the same as base station element 160. MCS selection control store circuitry 260 can be the same as base station element 170. MCS protocols storage circuitry 270 can be the same as base station element 180. And mux 280 can be the same as base station element 190. The information stored in elements 240 and 150 can be the same. The information stored in elements 270 and 180 can also be the same. The above similarities mean that the outputs 282 of mobile unit mux 280 approximately concurrently (i.e., at logically the same time, but in reality after (small) transmission and propagation delay of the ACK/NAK signal from MS to BS in the DL operation) mirror the outputs 192 of base station mux 190. Accordingly, whenever the base station circuitry shown in FIG. 3 is making a change in the MCS used by transmitter 110, the mobile station circuitry shown in FIG. 3 automatically, autonomously, and independently makes the same change in the MCS used by receiver 210. Elements 110 and 210 can thereby continue to "talk to" one another uninterruptedly, even though the MCS used on link 112a may have changed. Moreover, this communication can continue without disturbing, interrupting, or otherwise altering an on-going persistent scheduling communication sequence. No new, additional, or supplementary initiation or MAP data needs to be communicated to effect this MCS change. Elements 100 and 200 remain synchronized with one another with respect to what MCS is being used solely as a result of the conventional transmission of the conventional ACK and NAK signals or bursts (e.g., as at 16a, 16b, 16b', and 16c in FIG. 2).

If the MCS used by base station receiver 120 also changes with a transmitter 110 MCS change (e.g., in the more general case that the circuitry is intended to handle UL as well as DL communication), then the outputs 282 of mobile unit mux 280 should also be applied to mobile unit transmitter 220 to keep that element's MCS selection synchronized with the MCS of receiver 120. On the other hand, the branch of output 282 to transmitter 220 may not be needed in the mobile unit for DL operation (in which transmitter 220 only needs to send the ACK/NAK over transmission link 112b).

FIG. 4 shows an illustrative embodiment of transceiver circuitry 300 in accordance with the disclosure that can be used in either a base station or a mobile unit. In one implementation, one instance of circuitry 300 can be used in a base station, and another instance of circuitry 300 can be used in a mobile unit. In such a system, base station transmission link terminals 312a and 312b are operatively coupled to mobile unit transmission link terminals 312b and 312a, respectively. Such a system can be used for full, two-way (i.e., DL and UL) communication between the base station and the mobile unit. Thus either of these components can send data bursts to the other component, and either component can generate and send ACK and NAK signal bursts to the other component. On the other hand, it may still be the case that only the base station can send MAP bursts.

Figure 6:
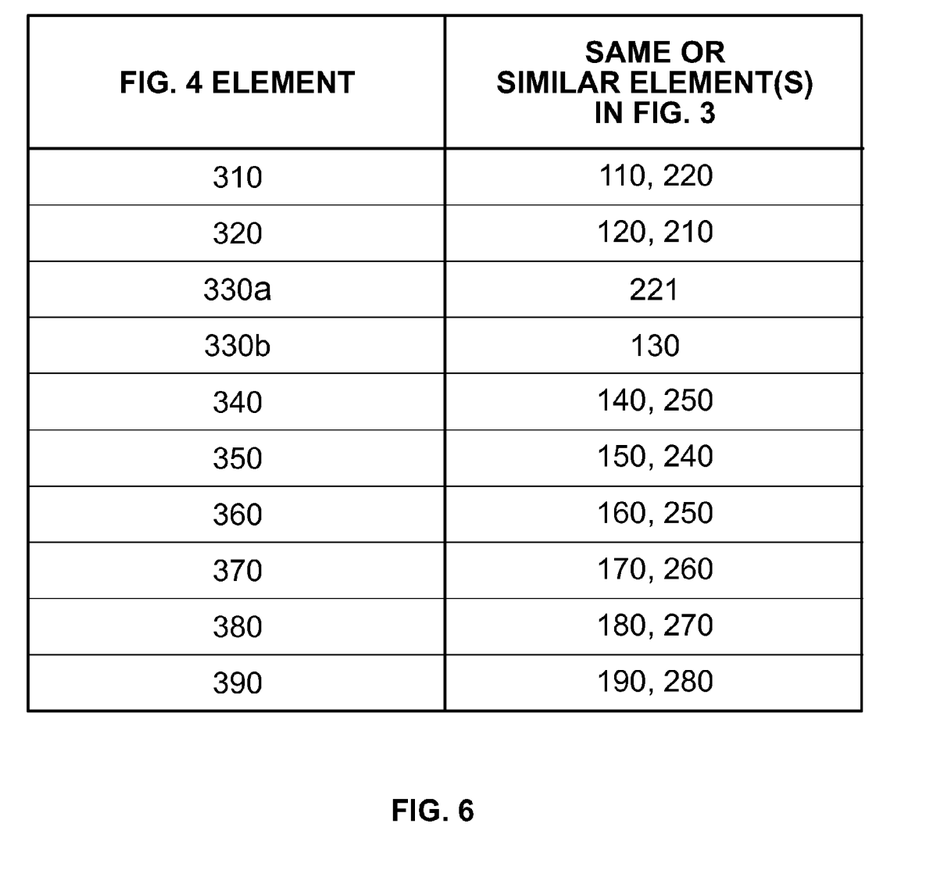
FIG. 6 is a table showing correspondence between components that are the same or similar in FIGS. 3 and 4.

FIG. 6 shows that all of the circuit components in FIG. 4 are either the same as or very similar to one or two components in FIG. 3. For example, element 310 in FIG. 4 is the same as or similar to either of elements 110 and 220 in FIG. 3. It will therefore not be necessary to again describe most of the elements in FIG. 4, because they are already explained by the earlier description(s) of the corresponding element(s) in FIG. 3.

The only significant difference between FIG. 4 and earlier-described FIG. 3 is that in FIG. 4 each instance of circuitry 300 can both generate an ACK or NAK signal (element 330a), and recognize an incoming ACK or NAK signal that has been received from the other instance of circuitry 300 (element 330b). ACK and/or NAK record circuitry 340 can maintain a record of both of these kinds of ACK and/or NAK occurrences. For example, circuitry 340 may maintain one combined record for all of these ACK and/or NAK occurrences (i.e., ACK/NAK signals originated locally by the same device 300, and ACK/NAK signals originated remotely by the other device 300 in the pair of devices that is communicating via link 312). Each instance of circuitry 300 is therefore independently and automatically monitoring the success rate of communication in both directions between a base station and a mobile unit. Both of these base and mobile components monitor this success rate in the same way and apply the same reference standard 350 to the results of that monitoring. Thus both component 300 instances autonomously and concurrently (i.e., at logically the same time, but in reality after (small) transmission and propagation delay of the ACK/NAK signals between the MS and BS) reach the same conclusion about whether the MCS currently being used should continue to be used. If circuitries 300 determine that the current MCS should not continue to be used, then both of circuitries 300 autonomously and concurrently change to the same new MCS so that communication can continue uninterrupted. In particular, any persistent scheduling communication that is underway can proceed with only a change in MCS. (Note that if the FIG. 4 circuitry is to be employed in a DL-only system, then some of the control connections shown in FIG. 4 can be omitted as mentioned in the earlier discussion of FIG. 3. Which control connections are omitted will depend on whether a particular instance of the FIG. 4 circuitry is in the BS or the MS.)

Methods of operating circuitry in accordance with this disclosure will be apparent to those skilled in the art from the information that has been provided thus far. As a further aid with regard to such operating methods, an example is provided in FIGS. 7A and 7B (which may sometimes be referred to collectively as FIG. 7).

FIG. 7 shows an illustrative embodiment of operating transceiver circuitry (e.g., a mobile unit like 200 or 300 in the earlier disclosure). FIG. 7 concentrates on the DL operations of mobile unit or MS transceiver circuitry, but it will be apparent from other disclosure herein how the transceiver can also include UL operations and/or be a BS transceiver (see also FIG. 8).

Figure 7A:
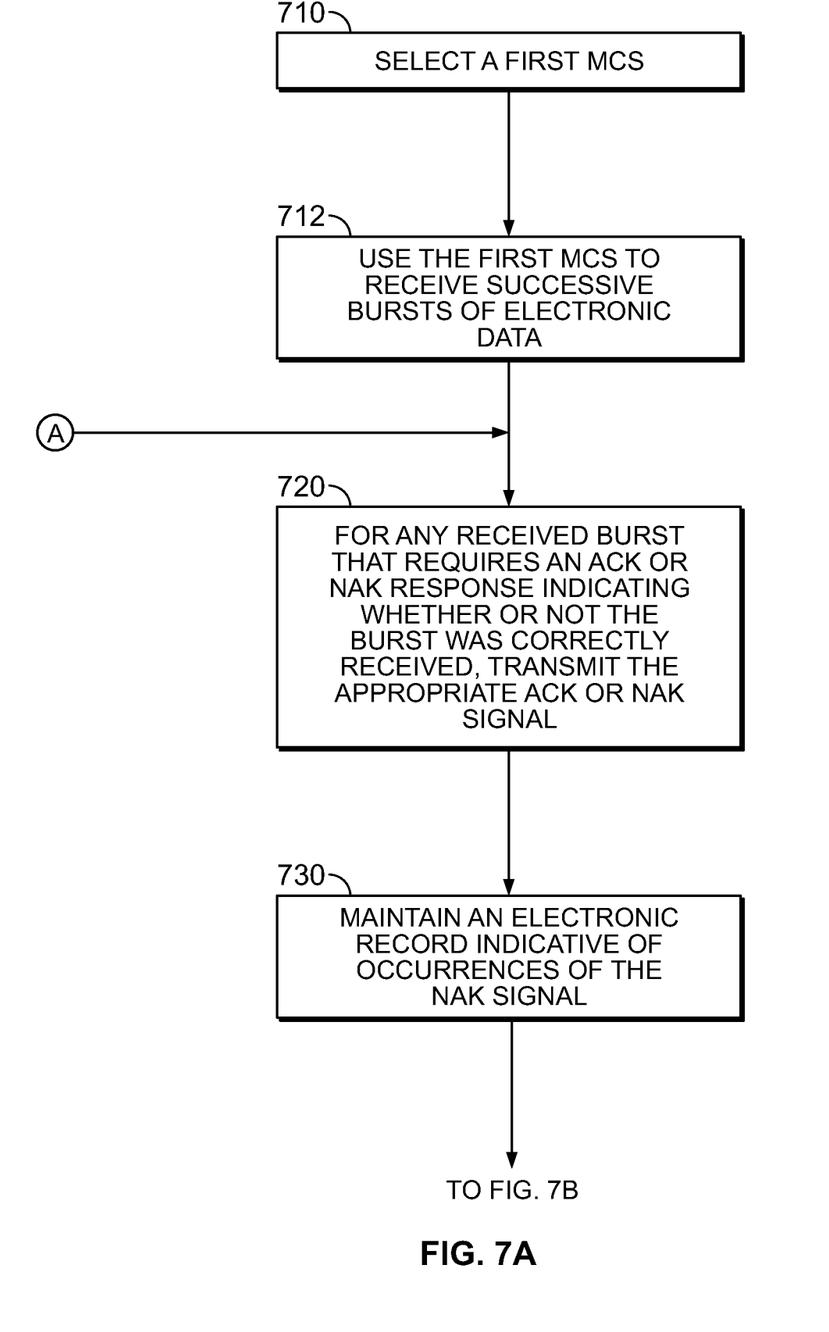
FIGS. 7A and 7B (sometimes referred to collectively as FIG. 7) are a simplified flow chart of an illustrative embodiment of methods in accordance with certain possible aspects of the disclosure.
Figure 7B:
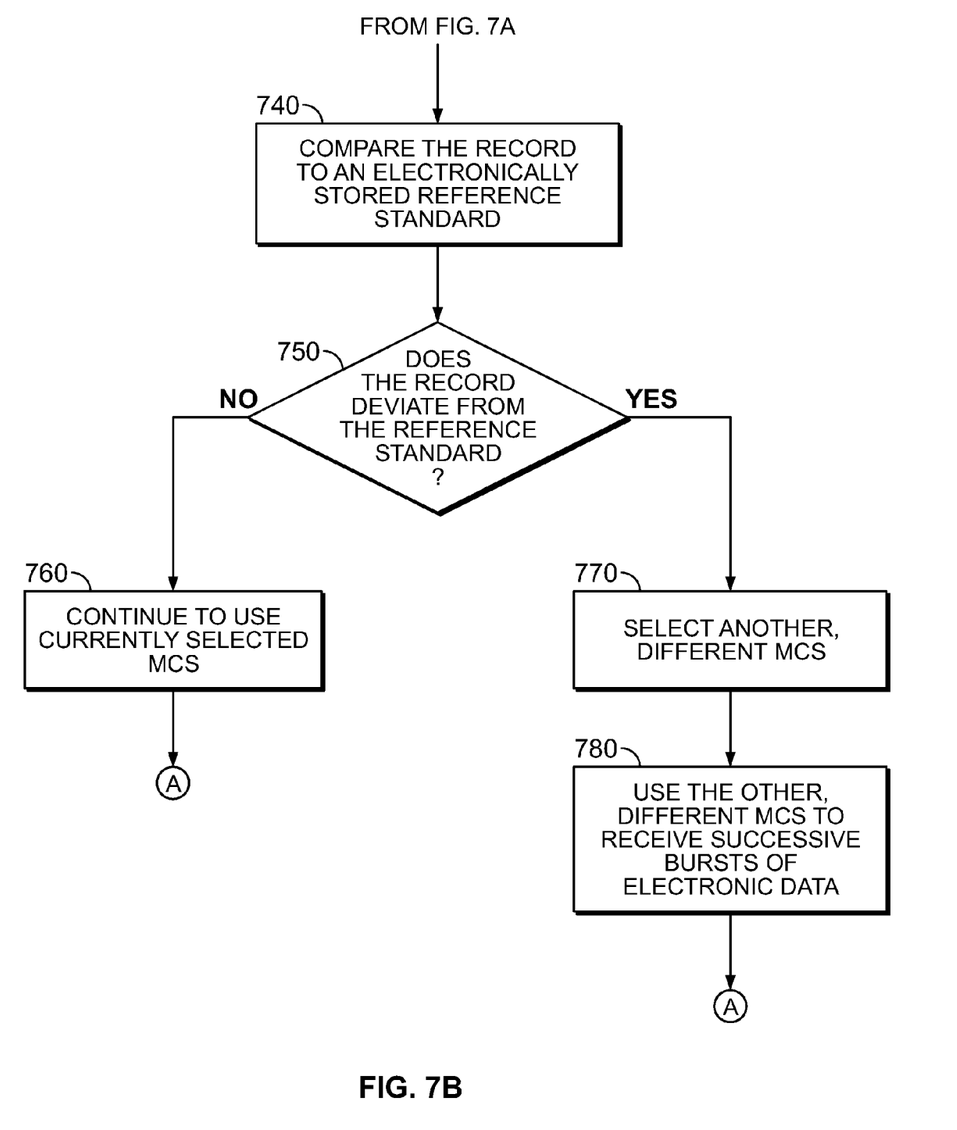

At 710 in FIG. 7A the transceiver circuitry selects a first MCS. This may be done in response to a MAP initiation command received by the transceiver from a base station transmitter. At 712 the transceiver uses the first MCS to receive successive bursts of electronic data. Such bursts may be DL bursts from a base station transmitter.

At 720, for any received burst that requires an ACK or NAK response indicating whether or not the burst was correctly received, the transceiver transmits the appropriate ACK or NAK signal.

Operation 730 shows that the transceiver maintains an electronic record (e.g., as in element 230 in FIG. 3) of occurrences of the NAK signal.

At 740 the transceiver compares (e.g., as in element 250 in FIG. 3) the record (e.g., from element 230) to an electronically stored reference standard (e.g., from element 240 in FIG. 3). For example, as described earlier in this disclosure, the reference standard may indicate an acceptable range for the number of NAK signals that have occurred for a predetermined number of the most recent attempted data burst receptions. If the actual record of NAK signals is not within that range, then it has "deviated" from the reference standard. Operation 750 (related to operation 740) tests whether the record deviates from the reference standard.

If operation 750 produces a negative ("no") result, then control passes to operation 760, which allows the transceiver to continue to use the currently selected MCS. Control accordingly loops back from operation 760 to operation 720. This is analogous, for example, to a "no change" output from element 250 in FIG. 3.

On the other hand, if operation 750 produces a positive ("yes") result, then control passes to operation 770, in which the transceiver selects another, different MCS. This is analogous to an "increment" or "decrement" output from element 250 in FIG. 3, for example; and it is further analogous to the operation of elements 260, 270, and 280 in FIG. 3, for example, to cause a different MCS to be selected by the transceiver. As described earlier in this disclosure, the other, different MCS that is thus selected may have greater transmission reliability or less transmission reliability than the previously selected MCS, depending on how operation 750 found the record to deviate from the reference standard.

At 780 the transceiver begins to use the newly selected, different MCS to receive successive bursts of electronic data. From 780, control loops back to 720 where operation of the transceiver continues using the newly selected, different MCS.

As mentioned earlier, FIG. 8 shows an illustrative embodiment of modification of the transceiver (e.g., mobile unit) operating method of FIG. 7 to include in the transceiver the ability to maintain a record of both the NAK signals it generates and any NAK signals it receives (e.g., from a base station transmitter). The FIG. 8 modifications to the operating method of FIG. 7 produce an operating method that can be implemented in transceiver circuitry constructed as shown, for example, in FIG. 4. Except for the added operations 822 and 824 shown in FIG. 8, this transceiver operating method can be as shown in FIG. 7.

Figure 8:
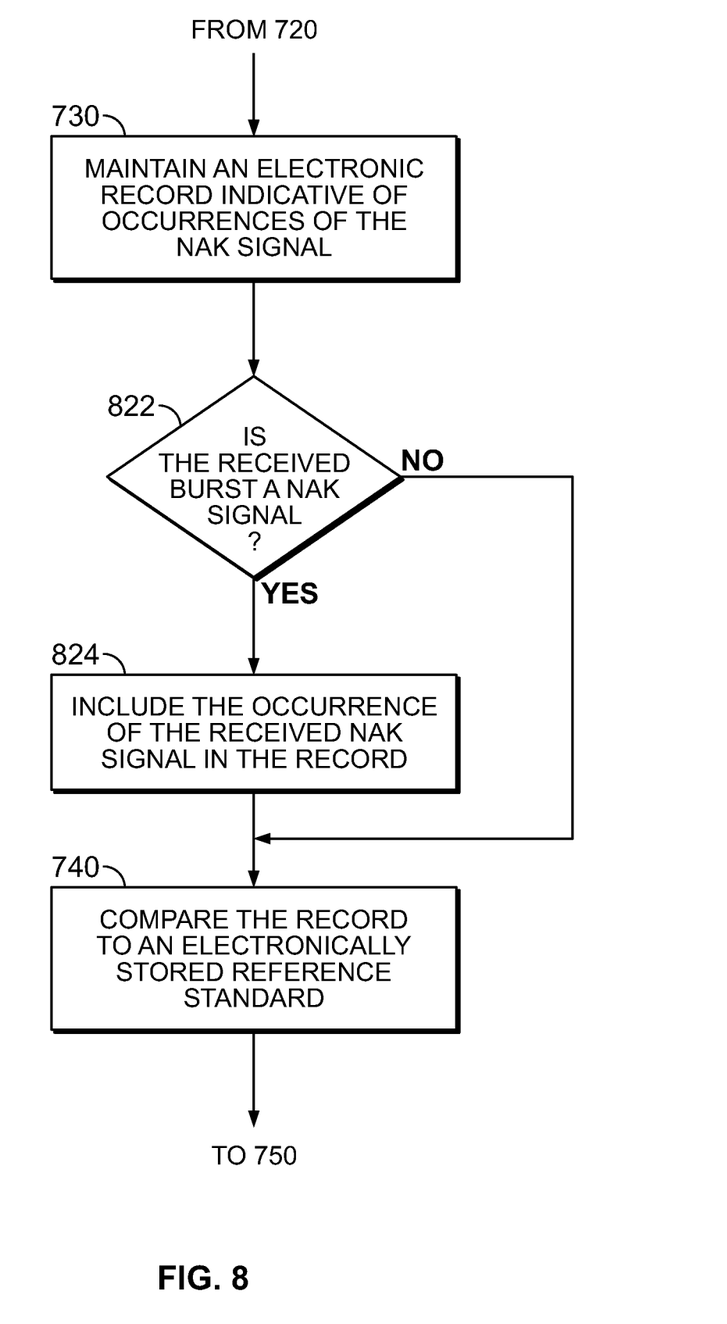
FIG. 8 is a simplified flow chart of an illustrative embodiment of a modification of a portion of the FIG. 7 method in accordance with certain other possible aspects of the disclosure.

It will therefore not be necessary to again describe any operations with reference numbers in the 700 series. Only added operations 822 and 824 will be described below.

In operation 822, the transceiver circuitry detects whether signals it has received are a NAK signal. This is analogous to what is done in element 330*b* in FIG. 4, for example. If the result of operation 822 is negative, control simply passes to previously described operation 740. On the other hand, if the result of operation 822 is positive, then control passes to operation 824.

In operation 824 the transceiver circuitry includes in the record it is maintaining (e.g., as in element 340 in FIG. 4) the occurrence of the received NAK signal. The record of NAK signals is therefore a record of both NAK signals generated by the transceiver and NAK signals received by the transceiver. From operation 824 control passes to previously described operation 740.

It will be understood that the foregoing is only illustrative of the principles of the disclosure, and that various modifications can be made by those skilled in the art without departing from the scope and spirit of the disclosure. For example, although some of the terms and illustrative examples employed herein are usually associated with WiMAX communication, it will be understood that the disclosure is equally applicable to many other forms of wireless communication employing persistent scheduling such as 3GPP LTE systems with semi-persistent scheduling ("SPS"). In addition, one or more steps of methods disclosed above may be performed in a different order (or concurrently) and still achieve desirable results. An exemplary use of the disclosure is for voice-over-internet protocol ("VoIP") communication.

What is claimed is:

1. A method of operating transceiver circuitry for electronic communication that can employ any one of a plurality of modulation and coding schemes ("MCSs"), the method comprising:
    selecting a first MCS of the plurality of MCSs;
    using the first MCS to receive successive bursts of electronic data, at least some of the bursts requiring the transceiver circuitry to transmit an acknowledge ("ACK") or non-acknowledge ("NAK") signal respectively indicative of whether or not the transceiver circuitry correctly received the burst;
    maintaining an electronic record indicative of occurrences of the NAK signal for a predetermined number of the bursts;
    when occurrences of the NAK signal for the predetermined number of the bursts reach a threshold, causing the transceiver circuitry to select a second MCS of the plurality of MCSs; and
    using the selected second MCS to receive further successive bursts of electronic data.

2. The method defined in claim 1, wherein the maintaining an electronic record comprises:
    making the electronic record also indicative of occurrences of any NAK signal received by the transceiver circuitry.

3. The method defined in claim 1, wherein the electronic communication is wireless communication.

4. The method defined in claim 3, wherein the electronic communication is voice-over-internet protocol ("VoIP") communication.

5. The method defined in claim 1, wherein the electronic communication is persistent scheduling communication.

6. The method defined in claim 1, wherein:
    the threshold comprises an upper threshold and a lower threshold;
    each of the plurality of MCSs has a respective transmission reliability measure by which the plurality of MCSs can be placed in a hierarchical order from lesser to greater transmission reliability;
    the causing the transceiver circuitry to select the second MCS of the plurality of MCSs causes the transceiver circuitry, in response to occurrences of the NAK signal for the predetermined number of the bursts rising to the upper threshold, to select an MCS that is adjacent to the first MCS in the hierarchical order and that provides greater transmission reliability than the first MCS; and
    the causing the transceiver circuitry to select the second MCS of the plurality of MCSs causes the transceiver circuitry, in response to occurrences of the NAK signal for the predetermined number of the bursts falling to the lower threshold, to select an MCS that is adjacent to the first MCS in the hierarchical order and that allows lesser transmission reliability than the first MCS.

7. The method defined in claim 6, wherein the maintaining an electronic record indicative of the occurrences of the NAK signal in the predetermined number of the bursts comprises maintaining a count of the occurrences of the NAK signal for the predetermined number of the bursts.

8. The method defined in claim 6, wherein the maintaining an electronic record indicative of the occurrences of the NAK signal in the predetermined number of the bursts comprises maintaining a fraction or percentage of the occurrences of the NAK signal relative to the predetermined number of the bursts.

9. Electronic circuitry for electronic communication using any one of a plurality of modulation and coding schemes ("MCSs"), the electronic circuitry comprising:
    receiver circuitry to receive successive bursts of data signals using any one of the plurality of MCSs;
    decision circuitry to determine whether a burst of data has been properly received, and if not, to cause transmitter circuitry of the electronic circuitry to transmit a non-acknowledge ("NAK") signal;
    record circuitry to maintain a record of occurrences of the NAK signal for a predetermined number of the bursts; and
    selection control circuitry to change which of the plurality of MCSs is used by the receiver circuitry when occurrences of the NAK signal for the predetermined number of the bursts reaches a threshold.

10. The electronic circuitry defined in claim 9, wherein the selection control circuitry additionally changes which of the plurality of MCSs is used by the transmitter circuitry when occurrences of the NAK signal for the predetermined number of the bursts reaches the threshold.

11. The electronic circuitry defined in claim 9, further comprising:
NAK signal detection circuitry to detect occurrences of NAK signals in signals received by the receiver circuitry, wherein the record circuitry also includes, in the record, occurrences of NAK signals detected by the NAK signal detection circuitry.

12. The electronic circuitry defined in claim 9, wherein:
the electronic communication is between a base station and a mobile unit; and
the electronic circuitry forms part of the mobile unit.

13. The electronic circuitry defined in claim 9, wherein:
the electronic communication is between a base station and a mobile unit; and
the electronic circuitry forms part of the base station.

14. The electronic circuitry defined in claim 9, wherein the electronic communication is wireless communication.

15. The electronic circuitry defined in claim 9, wherein the electronic communication is voice-over-internet protocol ("VoIP") communication.

16. The electronic circuitry defined in claim 9, wherein the electronic communication is persistent scheduling communication.

17. The electronic circuitry defined in claim 9, wherein:
the threshold comprises an upper threshold and a lower threshold;
each of the plurality of MCSs has a respective transmission reliability measure by which the plurality of MCSs can be placed in a hierarchical order from lesser to greater transmission reliability; and
the selection control circuitry selects an MCS having greater transmission reliability in response to occurrences of the NAK signal for the predetermined number of the bursts rising to the upper threshold.

18. The electronic circuitry defined in claim 17, wherein, in response to the occurrences of the NAK signal rising to the upper threshold, the selection control circuitry selects the MCS having next greater transmission reliability in the hierarchical order than the MCS currently in use.

19. The electronic circuitry defined in claim 17, wherein the selection control circuitry selects an MCS having lesser transmission reliability in response to the occurrences of the NAK signal for the predetermined number of the bursts falling to the lower threshold.

20. The electronic circuitry defined in claim 19, wherein, in response to the occurrences of the NAK signal for the predetermined number of the bursts falling to the lower threshold, the selection control circuitry selects the MCS having next lesser transmission reliability in the hierarchical order than the MCS currently in use.

* * * * *